H. C. GRANT.
MEANS FOR SECURING WHEELS TO AXLES.
APPLICATION FILED JULY 24, 1909.
965,705.
Patented July 26, 1910.
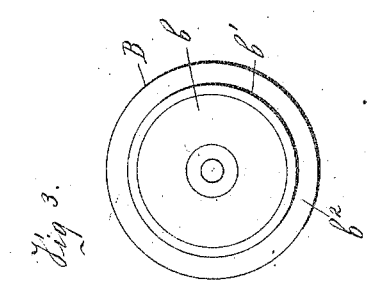
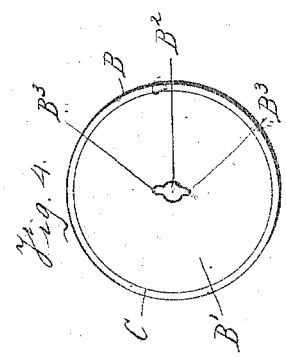
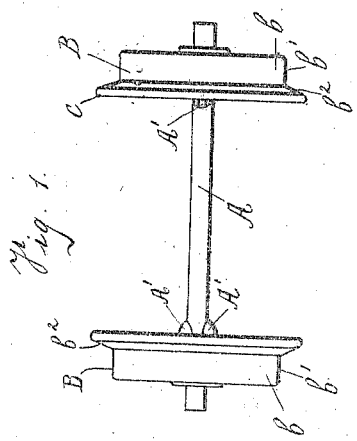
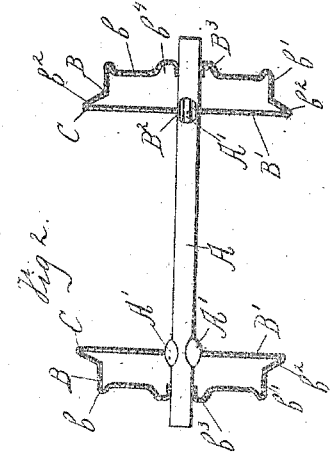
Witnesses
Inventor
Harry C. Grant
By his Attorney
Frank W. Ashley

UNITED STATES PATENT OFFICE.

HARRY C. GRANT, OF BAYONNE, NEW JERSEY.

MEANS FOR SECURING WHEELS TO AXLES.

965,705.  Specification of Letters Patent.  Patented July 26, 1910.

Application filed July 24, 1909. Serial No. 509,459.

*To all whom it may concern:*

Be it known that I, HARRY C. GRANT, a citizen of the United States, and resident of Bayonne, in the county of Hudson and State of New Jersey, have invented certain new and useful Improvements in Means for Securing Wheels to Axles, of which the following is a specification.

My invention relates to running gear for cars and the object of my invention is to provide a pair of wheels and an axle for toy cars which may be easily and cheaply made and held together.

A further object is to prevent the wheel turning relative to the axle.

Referring to the drawings which form a part of this specification,—Figure 1, is a front elevational view of the wheels and axle. Fig. 2, is a cross sectional view through the wheels and disclosing the outer surface of the axle. Fig. 3, is an end view of one of the wheels, and Fig. 4, is a view of the opposite end of said wheel.

The axle A, is preferably made from a piece of soft steel of circular cross section, and is provided with short oval webs or projections A', which are formed by pressing the metal from the rod by a die to about the form shown in the drawings and arranged one opposite the other on the rod.

The wheel B is made in two parts, both of which are stamped from thin sheet metal. The portion B' is formed in the shape of a disk and is provided with a hole $B^2$ at its center and a recessed or slotted portion $B^3$ located diametrically opposite to each other and of corresponding shape and dimensions to permit the webs A' of the axle to fit therein, the hole $B^2$ being a close sliding fit with the rod or axle A. The portion of the wheel $b$ is formed in the die to present a tread surface $b'$ and a flange $b^2$, the upper outer edge of which is pressed over the periphery of the disk portion at C to form a joint as shown. The portion B is further provided with a short tubular portion $b^3$, which is drawn to form from the metal as shown, and a recess or annular groove $b^4$ is also formed in the pressing operation. The metal is sufficiently thin to conform to the axle A when the end of the same is forced into the tubular portion $b^3$ and expands sufficiently under the pressure to form a tight frictional joint between the axle and tubular portion, and when the axle is in position as shown, the webs A' are located in the slots $B^2$ and effectually prevent the axle from turning relative to the wheel, even though the frictional joint at $B^3$ were to become loose by reason of the tubular portion splitting or from any other cause. The ends of the axle project through the wheels a sufficient distance to serve as bearings and are adapted to rest in the journals of the truck frame in the usual manner.

By the present construction I have overcome a number of difficulties heretofore encountered in making this part of the car gear and have provided a strong and durable construction of exceptional lightness and easy to assemble.

Having thus described my invention, what I claim as new and desire to secure by Letters Patent, is—

1. In combination, a wheel comprising two parts one of which is provided with a central bearing surface and the other of which has a slot adapted to receive a web; and an axle having a web located in said slot and one end of which engages said central bearing surface.

2. In combination, a wheel comprising two portions made from sheet metal and held together at their peripheral edges, one of said portions having a central tubular bearing surface; and an axle having a web formed integral therewith and engaging one of said portions to prevent relative rotation, and secured to said wheel by frictional engagement between said axle and said tubular bearing surface.

Signed at city of New York in the county of New York and State of New York this 20th day of July A. D. 1909.

HARRY C. GRANT.

Witnesses:
  A. T. SCHARPS,
  FRANK M. ASHLEY.